(12) United States Patent
Yasutake et al.

(10) Patent No.: US 7,866,205 B2
(45) Date of Patent: Jan. 11, 2011

(54) SAMPLE OPERATION APPARATUS

(75) Inventors: Masatoshi Yasutake, Chiba (JP);
Takeshi Umemoto, Chiba (JP)

(73) Assignee: SII Nano Technology Inc., Chiba-shi, Chiba (JP)

( * ) Notice: Subject to any disclaimer, the term of this patent is extended or adjusted under 35 U.S.C. 154(b) by 598 days.

(21) Appl. No.: 11/932,222

(22) Filed: Oct. 31, 2007

(65) Prior Publication Data
US 2008/0105044 A1    May 8, 2008

(30) Foreign Application Priority Data
Oct. 31, 2006    (JP) ............................. 2006-295213

(51) Int. Cl.
*G01B 5/28* (2006.01)
(52) U.S. Cl. ........................................ 73/105
(58) Field of Classification Search ............... None
See application file for complete search history.

(56) References Cited

U.S. PATENT DOCUMENTS 7,375,325 B2 *    5/2008    Burkhardt et al. ............ 250/307
2005/0145021 A1 *    7/2005    Chand et al. ................. 73/105
2008/0149832 A1 *    6/2008    Zorn ........................... 250/311

OTHER PUBLICATIONS

Takekawa et al., "Development in AFM tweezers for performing manipulation of nanomatter", Denki Gakkai Ronbunshi, E. Trans. SM, vol. 125, No. 11, pp. 448-453 2005.

* cited by examiner

*Primary Examiner*—Robert R Raevis
(74) *Attorney, Agent, or Firm*—Brinks Hofer Gilson & Lione

(57) ABSTRACT

There is provided a sample operation apparatus in which, by a static electricity force acting between a probe and a sample, an accurate position is gripped without the sample being moved, and the sample can be operated by the probe for an observation, a grip, a release, or the like. In a casing body capable of being sealed, there are installed a sample operation tweezers comprising an observation probe and a grip probe, and a sample base fixing a substrate on which the sample is mounted. By the facts that a surface of the substrate is treated such that its hydrophilic nature is higher than the sample operation tweezers, and that a humidity in the casing body is controlled by a humidity control device, there is made such that an actuation of a grip, a movement, a separation or the like of the sample is performed under a state in which water films are formed on the sample, the substrate and a surface of the sample operation tweezers.

6 Claims, 3 Drawing Sheets

SAMPLE OPERATION APPARATUS

RELATED APPLICATIONS

This application claims priority under 35 U.S.C. §119 to Japanese Patent Application No. JP2006-295213 filed Oct. 31, 2006, the entire content of which is hereby incorporated by reference.

BACKGROUND OF THE INVENTION

1. Field of the Invention

The present invention relates to a sample operation apparatus in which a sample (specified site) on a substrate is operated by scanning a sample surface to thereby obtain a surface shape or a physical property information of the substrate or the sample.

2. Description of the Related Art

As an apparatus for performing an observation of the surface shape of the sample, and a measurement of the physical property information or the like by measuring the sample, such as electronic material and organic material, in a micro region, there is known a scanning probe microscope such as atomic force microscope (AFM) or scanning tunnel microscope. Further, from the fact that this scanning probe microscope is accurate also as a three-dimensional positioning mechanism, various proposals are made also as a working apparatus of a micro portion.

As an application to an operation (manipulation) of the sample, in which the scanning probe microscope is used, there is contrived one called an AFM tweezers in which the sample is inserted between two probes and the sample is gripped/released.

As this AFM tweezers, in a cantilever used in the scanning probe microscope or the like, there is contrived 1) one in which two carbon nanotubes are attached as a tip onto silicon tip, 2) one in which a carbon nanotube is attached to a glass tube as the cantilever, additionally 3) one in which the two cantilevers are made from a silicon substrate by using MEMS (Micro Electro Mechanical Systems), or the like.

In the tweezers of 1) or 2), an opening/closing of the two carbon nanotubes is performed by applying a static electricity between two carbon nanotube tips and, in the tweezers of 3), there is known one in which an electrostatic actuator like comb teeth is constituted in order to grip by the two cantilevers, or one in which an electric current is flowed to a root of the cantilever and a linear expansion of silicon by a heat generation is used in a drive by being enlarged. (For example, refer to Tetsuya Takekawa, Hajime Hashiguchi, Ei'ich Tamiya, et al. "Development in AFM tweezers for performing manipulation of nanomatter" Denki Gakkai Ronbunshi, E. Trans. SM, Vol. 125, No. 11, 2005.)

Generally, the tweezers operates in a gravitational field, the sample is fixed onto a substrate by its own weight or other adhesion force and, in a case where a gripping force and a pulling-up force of the tweezers exceeds the own weight and the adhesion force, it is possible to grip the sample. Further, also as to a separation from the tweezers, if a grip of the tweezers is released, the sample separates by its own weight from the tweezers and drops to a substrate face.

However, if there becomes such a micro sample that a size of the sample is smaller than about 30 μm in diameter for instance, an effect by the own weight of the sample approximately balances with other adhesion force that the sample undergoes, and a motion such as the grip and the separation of the sample becomes complicated.

Since the AFM tweezers has a purpose of operating the grip and the separation of the sample whose diameter is fairly smaller than 30 μm, it follows that it undergoes large an influence of a force other than the gravity.

Especially, the influence of a static electricity force is large and, in the conventional AFM tweezers, since the sample is electrified by the static electricity force acting between the sample and a probe such as carbon nanotube tips, the sample moves on a substrate, so that there is an issue that the grip is not made well. For example, in a case of the sample, such as glass bead (whose diameter is several μm), on a glass substrate, the glass bead is normally electrified and, if the probe is approached in order to grip the glass bead by the AFM tweezers, the glass bead is adsorbed to the probe or repelled from the probe by the static electricity force between the probe and the glass bead and thus its position changes large, so that the operation such as the grip by the AFM tweezers or the separation is very difficult.

SUMMARY OF THE INVENTION

The present invention is made in view of the circumstances like these, and its object is to make such that, by controlling the static electricity force between the probe and the substrate or the sample, the sample can be accurately position-observed without being scattered, and a predetermined sample can be certainly gripped or separated.

In order to solve the above problem, the present invention adopts the following means.

The present invention is one in which, in order to buffer an electric potential of the probe and the substrate or the sample etc., which is due to an electrification resulting from the static electricity force or the like, surfaces of these are covered by thin water films, and the sample liable to disperse is fixed to the substrate by a surface tension of the water film, thereby more ensuring the grip and the separation of the sample in the AFM tweezers.

In the sample operation apparatus of the present invention, by the facts that the substrate mounted with the sample is made higher in its hydrophilic nature than a sample operation tweezers, and that the water films are formed on the substrate mounted with the sample and the sample operation tweezers, there becomes such that the grip and the separation of the sample can be certainly made by the sample operation tweezers without the sample on the substrate being dispersed.

Incidentally, the respective constitutions mentioned above can be mutually combined so long as not deviating from a gist of the present invention.

DETAILED DESCRIPTION OF THE INVENTION

Figure 1:
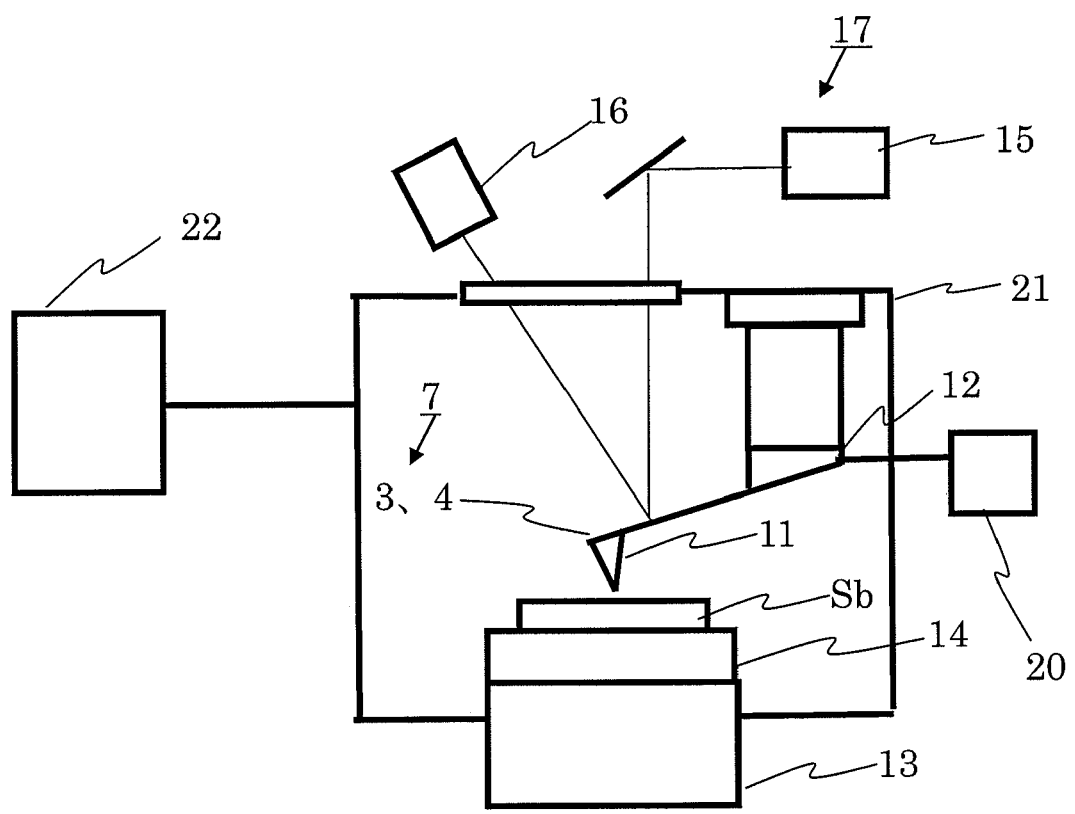
FIG. 1 is a schematic, constitutional diagram of a sample operation apparatus of the present embodiment.
Figure 2:
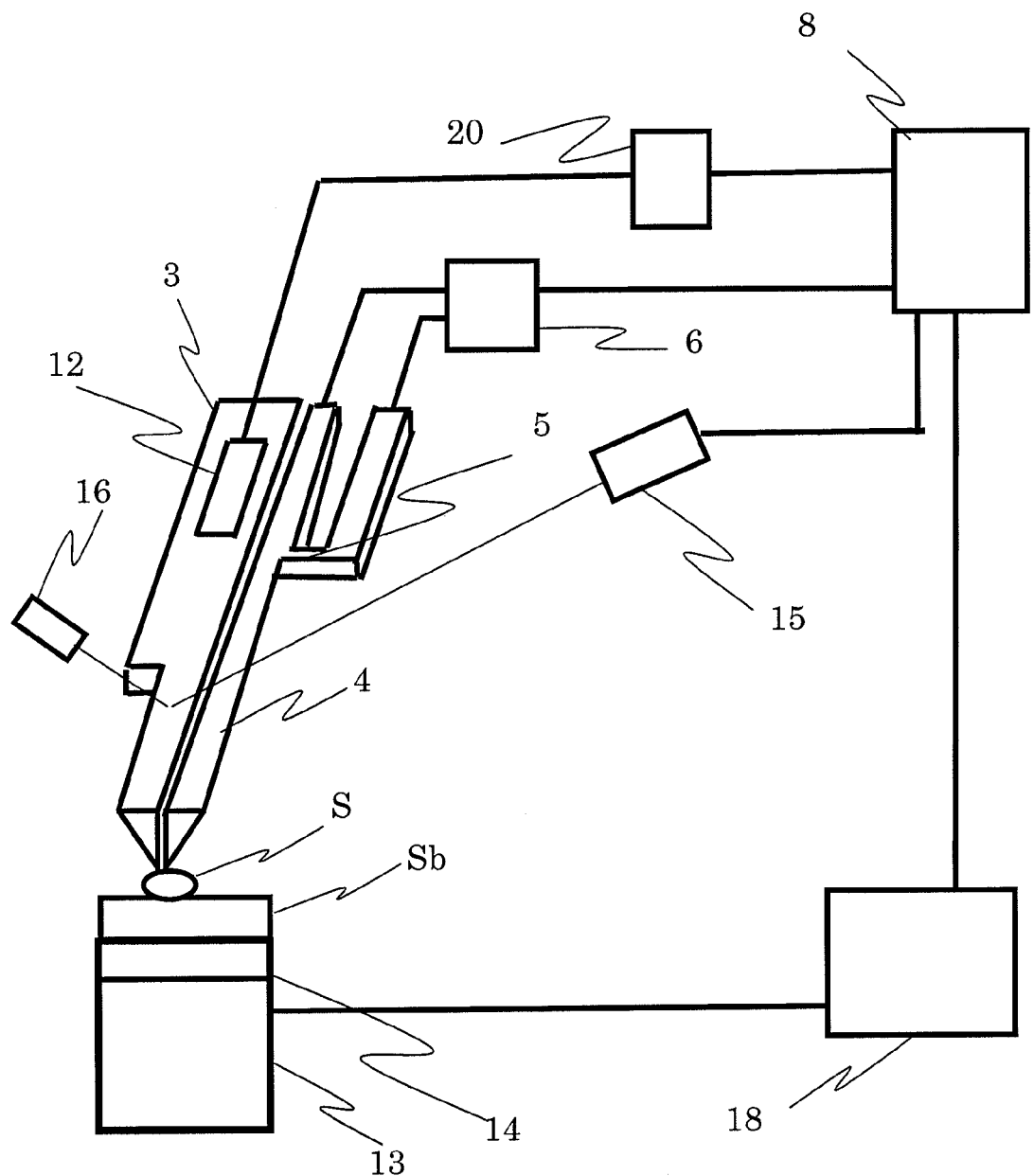
FIG. 2 is a block diagram showing an enlarged schematic constitution in a sample operation tweezers vicinity of the sample operation apparatus of the present embodiment.

Hereunder, a first embodiment of a sample operation apparatus by the present invention is explained by referring to FIG. 1 to FIG. 2.

A schematic constitution of the sample operation apparatus of the present embodiment is shown in FIG. 1.

To an outer part of a casing body 21, such as glove box, capable of being sealed, there is attached a humidity control device 22 for controlling a humidity inside the casing body 21.

There are provided an electrically conductive observation probe 3 having in its tip 11 and observing a shape of a sample S on a substrate Sb, an electrically conductive grip probe 4 gripping the sample S together with the observation probe 3, and a piezoelectric body control section 20 fixed to a piezoelectric body 12 for vibrating the observation probe 3, and controlling the piezoelectric body 12. Further, the substrate Sb is mounted on a sample base 14, and the sample S becoming an object article to be operated is disposed on the substrate Sb.

In the present embodiment, the observation probe 3 and the grip probe 4, which become a sample operation tweezers 7, are set such that their resonance frequencies differ by changing lengths of the probes, and additionally the observation probe 3 and the grip probe 4 are electrically insulated.

Incidentally, in order to make the resonance frequency variable, there may be changed a width, a thickness or the like.

There exist the sample base 14 mounting the sample S disposed opposite to the observation probe 3 and the grip probe 4, an XY scanner as a scan means, which relatively moves the observation probe 3 or the grip probe 4 and the sample base 14 in an XY direction parallel to a sample surface, and a Z scanner as a second scan means, which relatively moves it or them in a Z direction perpendicular to the sample surface, and there are possessed an XYZ scanner 13 becoming a three-dimensional movement means, in which the XY scanner and the Z scanner are made one body type, and an XYZ one body type scanner controller 18 becoming a scan control means, which includes an XY scan system and a Z servo system, which are for controlling the XYZ scanner 13.

Incidentally, in the present embodiment, in order to be relatively moved in three-dimensional directions of XYZ, although there is used the XYZ scanner using a piezoelectric element provided in a sample base side, this may be provided in a probe side, or while being separated to the XY scanner, the Z scanner, or the like.

Additionally, there is possessed a displacement measurement means 17 comprising a laser light source 16 generating a laser light, which is called an optical lever system, and a photodetector 15, such as photodiode, which is bisected or divided into four and detects a displacement of the observation probe 3 by detecting the laser light reflected by a back face of the observation probe 3.

Incidentally, not the optical lever system like the present embodiment, there may be used a system called a self detection type probe, which possesses a piezoelectric resistor in the observation probe 3 and finds a displacement of the observation probe as a displacement of this piezoelectric resistor.

Further, in FIG. 2, there is shown a block diagram showing an enlarged schematic constitution in a vicinity of the observation probe 3 or the grip probe 4 in the sample operation apparatus of the present embodiment.

Tips of the observation probe 3 and the grip probe 4 of the present embodiment are made a state opened while being separated by about 4 μm, and the tips of the observation probe 3 and the grip probe 4 have an electrical conductivity and are grounded to the earth.

There is explained about a method of closing the observation probe 3 and the grip probe 4 in order to grip the sample. A heating part 5 becoming a thermal actuator is provided in a hinge part in a root of the grip probe 4 comprising silicon (Si). Since the heating part 5 has a shape thinner than other portion, by the fact that the heating part 5 is heated by being supplied with an electric current, by a linear expansion of the heating part 5 the grip probe 4 can be closed by rotating in an observation probe 3 side direction. Further, there is connected a heating electric source 6 for controlling a current-supplied heating to the heating part 5.

Additionally, there is provided a control device 8 controlling the piezoelectric body control section 20, the heating electric source 6, the XYZ one body type scanner controller 18, the photodetector 15, and the like.

Hereunder, there are explained about surface treatments of the substrate Sb, the observation probe 3 and the grip probe 4.

In the present embodiment, there is used one in which a silicon oxide ($SiO_2$) film is formed by thinly oxidizing a surface of a silicon (Si) substrate whose flatness as the substrate Sb is good and whose hydrophilic nature is good. In the observation probe 3 and the grip probe 4, the tips of both probes comprising silicon (Si) are immersed into hydrofluoric acid to thereby form a surface hydrogen-terminated in order to make them more water-repellent than the substrate Sb. Additionally, in order to increase a durability of the observation probe 3 and the grip probe 4, surfaces of both probes are coated by a fluoroplastic such as Teflon (trademark registration number 465605, or the like). By these surface treatments, the substrate Sb is made such that its hydrophilic nature becomes higher than the observation probe 3 and the grip probe 4, which become the sample operation tweezers 7.

Figure 3:
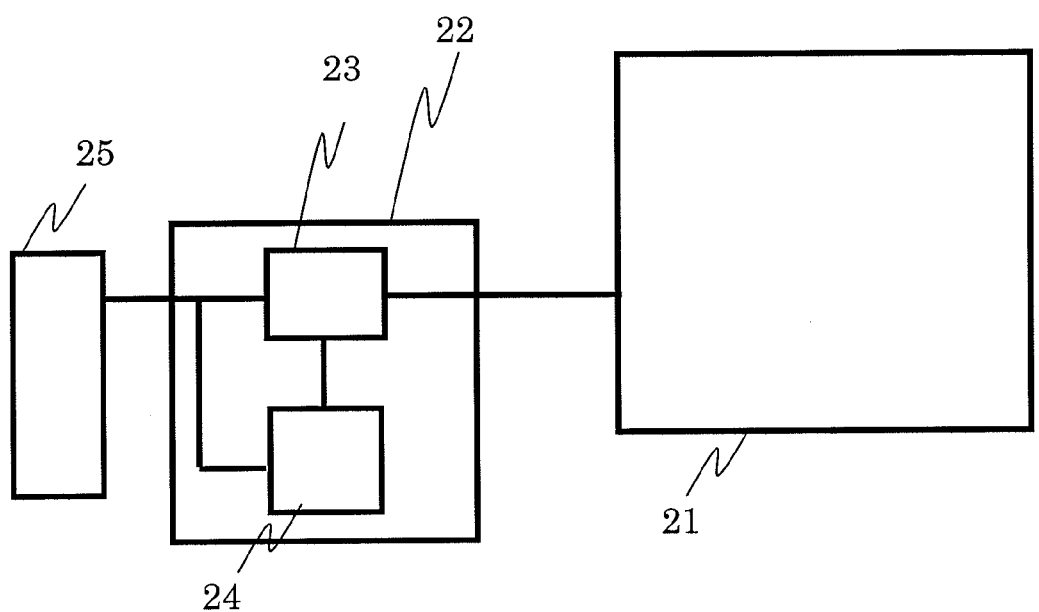
FIG. 3 is a schematic, constitutional diagram of a humidity generation device.

In FIG. 3, there is shown a schematic, constitutional diagram of a humidity generation device. A dried gas source 25 for flowing dried air or dried nitrogen is attached to the humidity control device 22, and it is introduced to a steam generator 24 and a mixer 23, which are possessed in the humidity control device 22.

In the steam generator 24, distilled water is stored, and the dried air or the dried nitrogen is made the air or the nitrogen gas, which contains the steam, by passing through the steam generator 24, and introduced to the mixer 23.

In the mixer 23, there is made such that the dried air or the dried nitrogen from the dried gas source 25 is mixed with the air or the nitrogen gas, whose humidity is high, from the steam generator 24 and it is controlled to a predetermined humidity, and thereafter it can be introduced to the casing body 21.

Next, hereunder, there is shown a method of gripping or separating the sample on the substrate in the sample operation apparatus concerned with the present embodiment.

First, there is installed the substrate Sb mounted with the sample S is installed on the sample base 14 in the casing body 21 and, in order to form water films on surfaces of the sample S and the substrate Sb and additionally on surfaces of the observation probe 3 and the grip probe 4, a water vapor is introduced from the humidity control device 22 such that the humidity in the casing body 21 becomes 70% for instance.

Under a state in which the water films are formed, it is left intact for several minutes.

By these formed water films, grip actuations of the observation probe 3 and the grip probe 4 can be facilitated. First, by the water films enveloping the sample S and the substrate Sb, it is possible to shield an electric charge locally existing in the sample S, thereby lowering an electric potential difference between a sample surface and a sample periphery. And, by the fact that the sample base 14 is grounded to the earth, this electric potential difference becomes extremely small. On the other hand, as to the water films formed on the surfaces of the observation probe 3 and the grip probe 4, the observation probe 3 and the grip probe 4 become approximately an earth electric potential, and an action of the static electricity force between the sample S and the observation probe 3 or the grip probe 4 becomes extremely weak. Additionally, a meniscus of the water occurs between the sample S and the substrate Sb and, by the surface tension of this meniscus, a force acts in a direction attracting the sample to the substrate, so that it is possible to reduce a scattering of the sample on the substrate.

With the purpose of monitoring a thickness of the water film, a force distance curve in a contact mode of the substrate is measured by using the observation probe 3 of the sample operation tweezers 7, and there is recorded a jump (if the humidity is high, this jump becomes large) when the observing probe separates from the substrate.

The sample on the substrate is observed by the observing probe to thereby index a position of the sample to be gripped, and a positional alignment is performed such that the sample to be gripped becomes between the observing and gripping probes.

Next, the heating part 5 of the grip probe 4 is heated by the heating electric source 6 to thereby raise a temperature of the grip probe 4 and, by this the grip probe is displaced, thereby making such that there is closed between the observation probe 3 and the grip probe. By this, the sample S is retained.

And, under a state in which the sample S is retained by the observation probe 3 and the grip probe 4, there is moved in the Z direction perpendicular to the substrate Sb surface by using the XYZ scanner 13, and the observation probe 3 and the grip probe 4 are relatively separated in regard to the substrate Sb surface till a position in which the sample S can be separated from the substrate Sb. Additionally, while retaining its height, by using the XYZ scanner 13, the observation probe 3 and the grip probe 4 are relatively moved in regard to the substrate Sb surface till a predetermined position in the XY direction horizontal to the substrate Sb surface.

And, by using the XYZ scanner 13, the observation probe 3 and the grip probe 4 are relatively approached in regard to the substrate Sb surface in the Z direction perpendicular to the substrate Sb surface till a position in which the sample S contacts with or approaches to the substrate Sb. At this time, there is made such that, by the fact that a displacement of the observation probe 3 is measured by using the displacement measurement means 17, a distance between the observation probe 3 and the substrate Sb is detected, and an actuation of the XYZ scanner 13 is stopped in a predetermined position.

Next, if the heating of the heating part 5 is stopped and a spacing between the observation probe 3 and the grip probe 4 is opened, since the observation probe 3 and the grip probe 4 become more water-repellent than the substrate Sb, the sample S is strong in its adhesiveness with the substrate Sb, so that the sample S moves to the substrate Sb side, and thus the sample S is separated from the observation probe 3 and the grip probe 4.

After the sample separation, the observation probe 3 and the grip probe 4 are pulled up by using the XYZ scanner 13, and the dried air or the dried nitrogen is introduced into the casing body 21 from the humidity control device 22, thereby lowering the humidity.

By doing like the above, a series of actuations of the grip, the movement, the separation, and the like of the sample in the sample operation apparatus concerned with the present invention finish.

Incidentally, in the present embodiment, there is made such that, when the sample S is being continuously gripped while heating the heating part 5, a grip probe tip temperature can be controlled by applying continuously or like a pulse a voltage of about ¼-½ of a voltage from the heating electric source, at which the spacing between the observation 3 and the grip probe is completely closed.

Incidentally, the temperature of the substrate or the sample may be controlled by providing a sample base temperature control mechanism capable of heating or cooling the sample base 14. On that occasion, the heating of the sample base is possible if a heater for the sample base is buried in the sample base 14, and the cooling is possible if a Pertier element is installed in a lower part of the sample base 14.

By this heating or cooling mechanism for the sample base, it becomes possible to thin the water film by raising temperatures of the probe and the sample, or thicken the water film by lowering temperatures of the probe and the sample, so that there is an advantage that it becomes easy to form a predetermined water film.

What is claimed is:

1. A sample operation apparatus having:
   a casing body capable of being sealed,
   a sample operation tweezers comprising an observation probe having a tip, and a grip probe provided while adjoining the observation probe with a predetermined distance,
   a sample base fixing a substrate on which a sample is mounted,
   the sample operation tweezers and the sample base being possessed in the casing body,
   a humidity control device controlling a humidity in the casing body,
   a displacement detection means detecting a displacement of the observation probe, and
   a three-dimensional movement means moving the observation probe or the grip probe in three-dimensional directions relative to a surface of the sample base,
   wherein the sample operation tweezers is made such that its hydrophilic nature becomes lower than the substrate.

2. A sample operation apparatus according to claim 1, wherein the sample operation tweezers has an electrical conductivity and is grounded.

3. A sample operation apparatus according to claim 1, wherein the sample base is grounded.

4. A sample operation apparatus according to claim 1, wherein the sample operation tweezers has a surface treated so as to become water-repellent.

5. A sample operation apparatus according to claim 1, wherein the grip probe has a heating part.

6. A sample operation apparatus according to claim 1, wherein the sample base possesses a sample base temperature control mechanism controlling a temperature of the sample base.

* * * * *